United States Patent [19]

Bansevichus et al.

[11] 4,397,188
[45] Aug. 9, 1983

[54] PIEZOELECTRIC RESONANT CONTACT SENSOR

[75] Inventors: Ramutis J. Bansevichus, Kaunas; Vladas-Algis A. Gapshis, Vilnjus; Albinas J. Kasparaitis, Vilnjus; Viktor V. Perfilov, Vilnjus; Alvidas J. Ragauskas, Vilnjus, all of U.S.S.R.

[73] Assignee: Experimentalny Naucho-Issledovatelsky Institut Metallorezhuschikh Stankov Enmis Vilnjussky Filial, Vilnjus, U.S.S.R.

[21] Appl. No.: 261,166
[22] PCT Filed: May 30, 1980
[86] PCT No.: PCT/SU80/00096
  § 371 Date: Jul. 5, 1981
  § 102(e) Date: May 1, 1981
[87] PCT Pub. No.: WO81/01334
  PCT Pub. Date: May 14, 1981

[30] Foreign Application Priority Data

Nov. 5, 1979 [SU] U.S.S.R. .......................... 2830457

[51] Int. Cl.³ .......................................... G01H 13/00
[52] U.S. Cl. .................................................. 73/651
[58] Field of Search .............. 73/651, 649, 658, 634, 73/662, 579

[56] References Cited

U.S. PATENT DOCUMENTS 4,246,795 1/1981 Sigg et al. .................. 73/651
4,294,121 10/1981 Inoue ......................... 73/662

FOREIGN PATENT DOCUMENTS 1445977 8/1976 United Kingdom .
234765 10/1969 U.S.S.R. .
611148 8/1979 U.S.S.R. .
679868 8/1979 U.S.S.R. .

Primary Examiner—Stephen A. Kreitman
Attorney, Agent, or Firm—Steinberg & Raskin

[57] ABSTRACT

A piezoelectric resonant contact sensor includes an enclosure representing a hollow body of revolution and housing a piezoelectric vibration exciter disposed in a manner providing an acoustic contact. The shape of the exciter is selected to suit the shape of the enclosure. The enclosure accommodates at least two rods with contact lugs which are located so that their axes are perpendicular to the surface of the enclosure. The piezoelectric exciter forms a common oscillatory system in conjunction with the enclosure, the rods and the contact lugs. In the common oscillatory system oscillation frequency of the enclosure with the rods and the contact lugs is equal to the oscillation frequency of a sine-wave electrical signal fed to an exciting electrode of the piezoelectric vibration exciter.

8 Claims, 9 Drawing Figures

PIEZOELECTRIC RESONANT CONTACT SENSOR

BACKGROUND OF THE INVENTION

The present invention relates to measuring apparatus and in particular to devices for measuring linear dimensions. More specifically, it concerns a piezoelectric resonant contact sensor.

BACKGROUND ART

A contact sensor is one of the main assemblies of a coordinate measuring machine, which determines to a large extent its accuracy, versatility and degree of automation. The error introduced by the contact sensors is one of the fundamental errors of the coordinate measuring machine. It may be a predominant error in measuring small dimensions by the use of precision coordinate measuring machines. The known contact sensors utilized with automated and distant-reading precision coordinate measuring machines do not meet present-day requirements for accuracy, sensitivity and versatility. Disadvantages of the prior art sensors are low stability in determining the moment at which the measured surface is contacted in a desired direction, a varying amount of absolute displacement of the control lug of the sensor from the initial to the response position, a changing measuring force required to make a contact in different directions of measuring parametric deviations of a given part, and low accuracy with which the contact lug returns to the initial position after signal reproduction.

Known in the art is an electrocontact probe (cf. British Pat. No. 1,445,977, Cl. G01B 7/02, "Izermitelnaya Technika", August 1976) comprising a rod with a contact lug secured to a flange. The flange is centered in an enclosure by the use of three rollers disposed within the flange at an angle of 120° in a plane perpendicular to its axis and conjugated with three prisms formed by three pairs of support balls. The balls are installed within the enclosure of the probe in a manner providing isolation therefrom. The support balls and the rollers centering the flange simultaneously act as contacts of a series-connected electrical circuit. In measurement, after the contact lug touches the measured surface there occurs spatial displacement of the flange with respect to the enclosure whereby one or several contacts of the electrical circuit make. The circuit break indicates the moment at which the contact lug contacts the measured surface.

Disadvantages of the aforesaid electrocontact probe are inadequate accuracy in fixing the moment at which the contact lug contacts the measured part and unequal measuring forces in different measuring directions. These disadvantages are generally attributed to the fact that said forces are used to overcome a longitudinal force pressing the flange with the rod to the enclosure when the measuring direction coincides with the rod axis or to overcome a moment set up by said force pressing the flange to the enclosure in measuring parameters of a given part in other directions. The moment occurs due to a difference between the arms from the point at which the contact lug contacts the measured surface and from the point of application of the force pressing the flange to the flange turning axis when the electrical circuit is broken. The probe error is dependent upon great frictional slipping forces occurring between the balls and the rollers during small displacements of the flange with respect to the enclosure as the contacts break. Furthermore, the probe has only one measuring rod, a limitation substantially reducing a measuring accuracy and efficiency of the coordinate measuring machine in measuring parameters of intricately shaped parts. Also, the probe is less versatile. During parametric measurements, great forces displacing the rod with the contact lug are required to break the electrical circuit, a limitation causing considerable measuring errors.

Also known in the art is a piezoelectric resonant contact sensor comprising an enclosure with a piezoelectric vibration exciter and a contact lug arranged in a manner providing an acoustic contact between said lug and the piezoelectric vibration exciter whose one electrode is grounded, while the other electrode receives sine-wave electrical signals (cf. USSR Inventor's Certificate No. 234,765 published in the Bulletin of Inventions, No. 4, 1969, in Russian).

The piezoelectric vibration exciter represents a crystal bar mounting a contact lug and an electrode receiving sine-wave electrical signals from a sine-wave signal generator. The same electrode feeds electrical signals to a peak detector. The piezoelectric exciter with a contact lug forms an oscillatory system which performs forced oscillations at the frequency of the signal coming from the generator, said frequency being equal to the resonant frequency of the oscillatory system. In a free state the current flowing through the sensor reaches a maximum. The contact lug contacting the measured part sharply reduces the Q-factor of the oscillatory system and decreases the amplitude of the current flowing through the electrical circuit of the transducer, which is an indication of the contact between the contact lug and the measured part.

The foregoing contact sensor has been generally unsatisfactory due to low accuracy and efficiency. Furthermore, it is less versatile. The foregoing disadvantages are attributed to the fact that the sensor has only one contact lug. So, during measurements, it is necessary to rearrange the sensor and change orientation of the contact lug with respect to the coordinate axes of a coordinate measuring machine. This calls for verifying the new position of the contact lug relative to fixed initial coordinates of the machine. To obtain measurement data with due account taken of the radius of the contact lug and the displacement of its center from the initial to the response position, the computer program will be corrected after each rearrangement, a factor resulting in displacement of the contact lug relative to the rated position whereby the measuring accuracy is decreased. The verification of the lug position and introduction of corrections relative to a fixed verifier will increase the measurement time, a disadvantage decreasing efficiency and resulting in great additional errors. The dependence of current flowing through the sensor on variations of the amplitude of voltage furnished by a sine-wave voltage generator is another factor decreasing accuracy and sensitivity of the sensor. This disadvantage is associated with the fact that a threshold device of the coordinate measuring machine is aligned so that it operates in the event of great variations of the amplitude of current flowing through the sensor. Otherwise, spurious operation and displacement of the sensor would occur in accordance with the predetermined program with the contact lug making no contact with the measured surface.

SUMMARY OF THE INVENTION

The principal object of the invention is to provide a piezoelectric resonant contact sensor with a common oscillatory system comprising an enclosure housing a piezoelectric vibration exciter, which enhances the accuracy of parametric measurements of a part by the use of a coordinate measuring machine, increases efficiency and insures versatility.

The foregoing object is accomplished by a piezoelectric resonant contact sensor comprising an enclosure with a piezoelectric vibration exciter and a contact lug disposed to provide an acoustic contact between said lug and the piezoelectric vibration exciter. One electrode of the sensor is grounded while the other electrode thereof receives sine-wave electrical signals. In accordance with the invention, the sensor enclosure represents a hollow body of revolution, wherein the piezoelectric vibration exciter is arranged in a manner providing an acoustic contact. The exciter represents a hollow structure corresponding to the shape of the enclosure. Provision is made for at least one additional contact lug and rods of a number corresponding to the number of the main and additional contact lugs disposed on the enclosure so that their axes are normal to its surface. The ends of the rods mounting the contact lugs are secured in a manner providing an acoustic contact. A common oscillatory system is formed by the contact lugs in conjunction with the rods, the enclosure and the piezoelectric vibration exciter. The frequency of self-oscillations of the enclosure with the rods and the contact lugs in the system is equal to the oscillation frequency of a sine-wave electrical signal. The piezoelectric vibration exciter contains at least one additional electrode acting as a measuring electrode and furnishing an output signal whose phase variation with respect to the phase of the sine-wave signal of the common oscillatory system is indicative of the moment at which the contact lug contacts the measured part.

It is advantageous that each rod has a length L determined by the relationship $$L = l_0 + l_1$$

where $l_0$ is the distance from the external surface of the enclosure to a nodal point "a" of rod oscillations;

$$l_1 = \frac{C}{4f_o}(1 + 2n);$$

C is the speed of sound in the material of the rod;

$f_o$ is natural frequency of the system formed by the enclosure with the rods and the contact lugs;

n = 0, 1, 2 . . . .

Preferably, each rod is of substantially cylindrical shape and the diameter d of each rod is determined by the relationship D/d > 5, where D is the maximum outer diameter of the enclosure.

Advantageously, each rod is rigidly secured to the enclosure.

Desirably, each rod is integral with the enclosure.

It is also of advantage that the sensor enclosure be a cylinder carrying five rods, four of which are arranged on the cylindrical surface of the enclosure in the same plane at an angle of 90° with respect to each other, while the fifth rod is disposed along the sensor axis on the end surface of the enclosure.

The sensor enclosure is preferably a ball-shaped structure carrying five rods disposed at an angle of 90° with respect to each other, four of said rods being located in a plane perpendicular to the sensor axis, while one rod is located along the sensor axis.

The sensor enclosure is preferably a cone-shaped structure accommodating six rods equidistant from the apex of the cone and with respect to each other.

The piezoelectric resonant contact sensor of the invention comprises an enclosure representing a hollow body of revolution housing a hollow piezoelectric element corresponding to the shape of the enclosure, which permits installation of several rods with contact lugs on the enclosure directed so that all surfaces of intricately shaped three-dimensional parts may be measured without rearranging the sensor. The advantages of the sensor of the invention are substantially enhanced measuring accuracy, increased efficiency and versatility of the machine. The arrangement of the rods with their axes normal to the surface of the enclosure assures high sensitivity at various points on the surface of the contact lugs in different measuring directions. The presence of at least one additional ungrounded electrode serving as a measuring electrode permits measuring a signal phase shift relative to a sine-wave voltage produced due to a direct piezoelectric effect. At the same time, it assures similar sensitivity of all measuring lugs. Furthermore, the rods may be arranged so that oscillations of the piezoelectric exciter occur in a perpendicular direction or along the rod axis, a factor assuring a high operational accuracy and stability of the sensor.

The utilization of a common oscillatory system comprising an enclosure, a piezoelectric exciter and rods with contact lugs and possessing a high Q-factor permits provision of a sensor having high operational sensitivity, enhanced accuracy and improved stability of all measuring rods with lugs. The use of a resonant frequency of the oscillatory system assures maximum sensitivity of the sensor and, in effect, a high accuracy in measuring parameters of a part by the use of a coordinate measuring machine.

The length of a measuring rod is chosen so that the contact lug is disposed in the area where rod oscillations have a maximum amplitude, a factor providing high sensitivity of the sensor. The contact lug has a high oscillation amplutude due to the fact that the diameter of the measuring rod is substantially smaller than the diameter of the sensor enclosure. Since the enclosure with rods and contact lugs can be easily assembled and disassembled, fabrication of the sensor entails a simplier procedure. Making the rods with contact lugs integral with the enclosure increases sensitivity and stability of indications in time under changing environmental conditions due to an ideal acoustic contact between the contact lugs, rods, and enclosure.

The cylindrical shape of the enclosure permits locating the rods in a plane perpendicular to the cylinder axis so that the axes thereof coincide with the direction of the coordinate axes of the coordinate measuring machine. Normally, about 70 to 80% of all measurements are performed in the indicated directions. The ball shape of the enclosure permits maximum versatility of the sensor due to an optimum number of rods required to solve a given metrological problem. The rods may, for example, be disposed along the coordinate axes of the machine at an angle of 90° with respect to each other. The cone shape of the enclosure assures a condition under which the direction of the rods is not coincident with the main coordinate phases of the coordinate measuring machine, a factor enabling measurement of intricately shaped parts.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
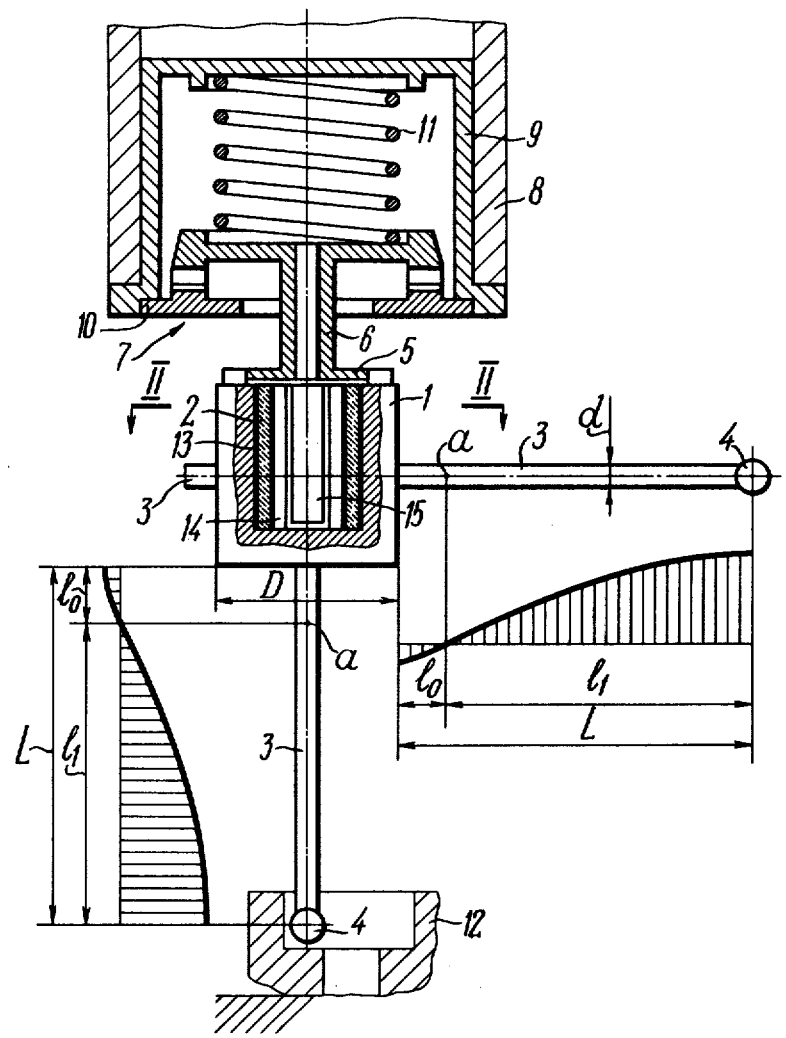
FIG. 1 is a view, partly cut away and partly in section, of the piezoelectric resonant sensor of the invention with an attachment unit and a measured part, and illustrates oscillations of sensor rods (a portion of an enclosure and a longitudinal section of the attachment unit)

The resonant contact sensor of the invention comprises an enclosure 1 (FIG. 1) representing a hollow body of revolution accommodating a piezoelectric vibration exciter 2 arranged in a manner providing an acoustic contact. The piezoelectric vibration exciter 2 is also a hollow structure whose shape suits the shape of the enclosure 1. In the illustrated embodiment of the invention, the enclosure 1 carries five rods 3 whose axes are normal to its surface. Three rods are shown in the drawing. Contact lugs 4 are provided on the ends of the rods 3. In the preferred embodiment of the invention, the contact lugs 4 are cemented to the rods 3 with glue based on epoxy resin to provide an acoustic contact therewith.

The enclosure 1 in conjunction with the piezoelectric exciter 2, the rods 3 and the contact lugs 4 forms a common oscillatory system, wherein the self-oscillation frequency of said enclosure 1 with said rods 1 and said contact lugs equals the oscillation frequency of a sine-wave electrical signal fed to said piezoelectric exciter 2.

The enclosure 1 of the sensor is rigidly secured to a flange 5 of a holder 6 of a unit 7 attaching the enclosure to a movable cross-arm 8 of a coordinate measuring machine (not shown in the FIGS.). The attachment unit 7 also includes an enclosure 9 rigidly secured to the movable cross-arm 8, a cover 10 secured to said enclosure, and a spring 11 contained within said enclosure. The unit 7 precludes breakage of the rods 3 when measuring parameters of a part 12 under check.

A grounded electrode 13 is disposed between the enclosure 1 and the piezoelectric exciter 2. Arranged on the external surface of the piezoelectric exciter 2 are an exciting electrode 14 and an additional electrode acting as a measuring electrode 15, its diameter being 10 times smaller than that of the enclosure.

Figure 2:
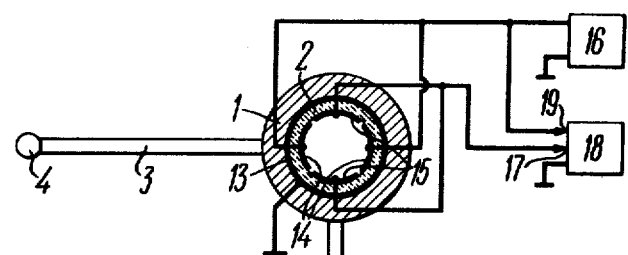
FIG. 2 is a view, partly in section and partly in block diagram, of the piezoelectric resonant sensor of FIG. 1, taken along the lines II—II of FIG. 1 and illustrates the connection of its electrodes according to the invention.

The exciting electrode 14 (FIG. 2) is connected to the output of a sine-wave generator 16. In the preferred embodiment of the invention, the exciting electrode 14 consists of two diametrically opposite parts. Likewise, the measuring electrode 15 is composed of two diametrically opposite parts. The measuring electrode 15 is connected to a signal input 17 of a phase detector 18 whose control input 19 is connected to the output of the sine-wave generator 16.

A signal is fed from the measuring electrode 15 to the input 17. A variation of its phase with respect to the phase of a sine-wave signal from the common oscillatory system indicates the moment at which the contact lug 4 (FIG. 1) contacts the measured part 12.

The length L of each rod 3 is the sum $(l_0+l_1)$, where $l_0$ is the distance between the external surface of the enclosure 1 and the nodal point "a" of oscillations of the rod 3, which is found experimentally. Referring to the curves of FIG. 1, the amplitude of oscillations of the rod 3 at the nodal point "a" equals zero. The value $l_1$ is determined from the following relationship:

$$l_1 = \frac{C}{4f_o}(1 + 2n)$$

where

C is the speed of sound in the material of the rod;
$f_o$ is the self-oscillation frequency of the system formed by the enclosure 1 and the rods 3 with the contact lugs 4;
n = 0, 1, 2 . . . .

The length L of each rod 3 is a chosen so that the contact lugs 4 are located in the area where the amplitude of oscillations of the rod 3 is maximum.

The rods 3 are of substantially cylindrical shape. The diameter d of each rod 3 is determined from the relationship $D/d > 5$, where D is the maximum outer diameter of the enclosure 1. The sensitivity of the sensor is increased by providing thin rods 3.

Each rod 3 is rigidly secured to the enclosure. In the preferred embodiment of the invention, the rods 3 are cemented to the enclosure 1 with glue based on epoxy resin. In another embodiment, each rod is integral with the enclosure 1. In this case, the sensitivity of the sensor is appreciably increased due to an ideal acoustic contact between the enclosure 1 and the rods 3.

Figure 3:
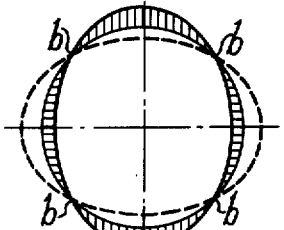
FIG. 3 depicts oscillations occurring in a piezoelectric exciter of the contact sensor of the invention in a plane perpendicular to its axis.

To enhance the sensitivity, the place of installation of the rods 3 on the enclosure 1 is determined considering the location of the exciting and measuring electrodes 14 and 15. FIG. 3 illustrates oscillations of the piezoelectric exciter 2 in a plane perpendicular to its longitudinal axis, depending on the oscillation amplitude of a sine-wave electrical signal fed to the exciting electrode 14. As seen in FIG. 3, the maximum amplitude coincides with the longitudinal axis of each of the four electrodes. Thus, the sensitivity of the sensor is increased by placing each rod 3 on the enclosure 1 in the area where the amplitude of oscillations of the piezoelectric exciter 2 is a maximum. The solid and dashed lines show the shape of the piezoelectric exciter 2 oscillating in the plane perpendicular to its longitudinal axis. Dead zones where the oscillation amplitude is zero are located at points "b."

In another embodiment of the invention, the enclosure 1 (FIG. 1) of the sensor is a cylinder accommodating five rods 3. Four rods are arranged on the side surface of the enclosure 1 in a plane perpendicular to the longitudinal axis of the sensor at an angle of 90° with respect to each other, while the fifth rod 3 is disposed along the sensor axis on the end surface of the enclosure 1.

Figure 4:
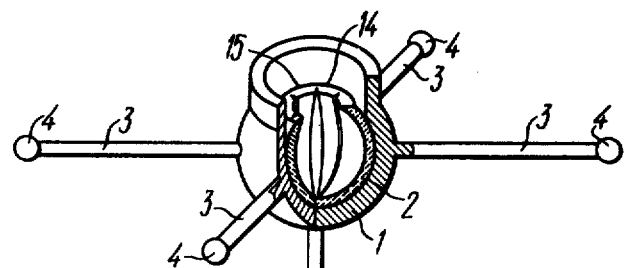
FIG. 4 is a general isometric view, partly cut away and partly in section, of an embodiment of the piezoelectric resonant contact sensor of the invention, comprising a ball-shaped enclosure.

In a still another embodiment of the invention the enclosure 1 of the sensor is a ball accommodating five rods 3 located at an angle of 90° with respect to each other (FIG. 4). The four rods 3 are arranged in a plane perpendicular to the sensor axis, while the fifth rod is located along said axis.

Figure 5:
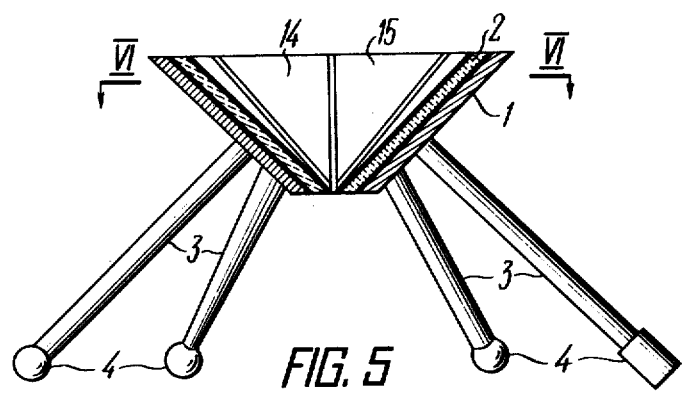
FIG. 5 is a a view, partly in longitudinal section, of another embodiment of the piezoelectric resonant contact sensor of the invention, comprising a conical enclosure.

In yet another embodiment of the invention, the enclosure 1 (FIG. 5) is a cone structure accommodating six rods 3 equidistant from the cone apex, the bases of said rods being located in a plane perpendicular to the cone axis equidistant from each other. The axes of the rods 3 are perpendicular to the side surface of the enclosure 1. Each of the exciting and measuring electrodes 14 and 15 consists of three parts successively disposed on the internal surface of the piezoelectric exciter 2, whereas the bases of the rods 3 are located in sections of the enclosure 1 containing longitudinal axes of the electrodes. This is done to provide maximum sensitivity of the contact lugs 4.

The rods 3 are either cylindrical or slightly conical structures. The shape of the lugs 4 may also vary. They may represent ball-shaped, cylindrical or circular structures.

Figure 7:
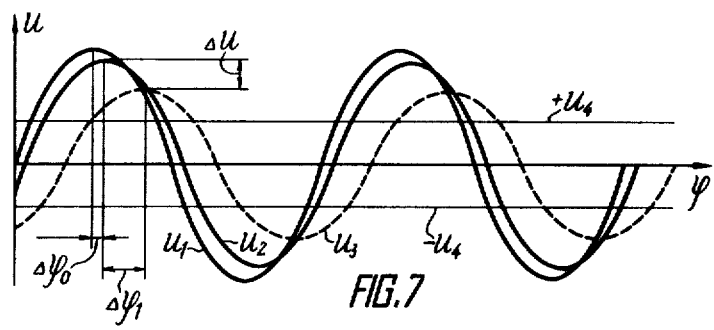
FIG 7 is a graphical presentation illustrating oscillations occurring in a common oscillatory system of the sensor of the invention.

FIG. 7 illustrates oscillations occurring in the common oscillatory system. In FIG. 7, phase $\phi$ is plotted on the abscissa and voltage is plotted on the ordinate. The sinusoid $U_1$ characterizes oscillations coming from the sine-wave generator 16 to the exciting electrode 14, while the sinusoid $U_2$ characterizes oscillations occurring in the oscillatory system due to a direct piezoelectric effect. It is shifted on the abscissa through an angle $\Delta\phi_0$ with respect to the sinusoid $U_1$. The sinusoid $U_3$ characterizes oscillations occurring in the oscillatory system at the moment the contact lug 4 contacts the surface of the measured part 12. It is shifted through an angle $\Delta\phi_1$, along the axis $\phi$ with respect to the sinusoid $U_2$. The plot $U_4$ depicts the output voltage of the phase detector.

Figure 8:
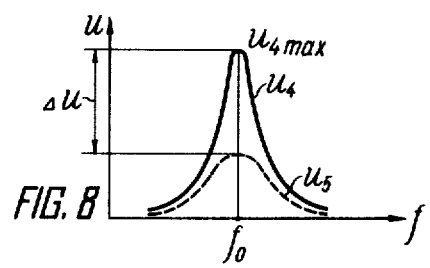
FIG. 8 is a graphical presentation of the amplitude-frequency characteristics of the common oscillatory system of the sensor of the invention, before, and at the moment of, contact.

FIG. 8 presents the amplitude-frequency characteristics of the common oscillatory system, where $U_4$ is the amplitude-frequency characteristic of the contact sensor before the surface of the measured part 12 is contacted, and $U_5$ is the amplitude-frequency characteristic of the sensor at the moment the sensitive lug 4 contacts the surface of said measured part 12.

Figure 9:
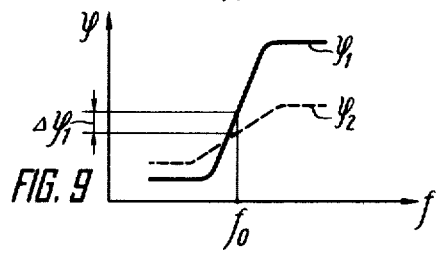
FIG. 9 is a graphical presentation illustrating dependence of a phase of the common oscillatory system of the sensor of the invention on an oscillation frequency of a generator voltage.

FIG. 9 illustrates the dependence of the phase of the oscillatory system on the oscillation frequency. In FIG. 9, $\phi_1$ is a plot illustrating a variation of the phase of the oscillatory system depending on the frequency before the contact lug 4 contacts the measured part 12, and $\phi_2$ is a plot showing a frequency-dependent variation of the phase at the moment said contact lug contacts the surface of said measured part 12.

The piezoelectric resonant contact sensor of the present invention operates in the following manner.

The exciting electrode 14 (FIG. 2) accepts a high-frequency sine-wave AC voltage from the sine-wave generator 16. Under the action of the voltage, the piezoelectric vibration exciter 2 performs oscillations in a direction perpendicular to its longitudinal axis at a frequency equal to the oscillation frequency of the sine-wave voltage $U_1$ of the generator 16. HF oscillations of the piezoelectric exciter 2 induce oscillations in the enclosure 1 and in the measuring rods 3 with the contact lugs 4. The rods 3 are perpendicular to the axis of the enclosure 1. Their oscillations are illustrated in FIG. 1. Also, axial oscillations occur in the piezoelectric exciter 2, the phase of said oscillations differing by half a period from the phase of radial oscillations.

Insofar as an acoustic contact is provided between the piezoelectric vibration exciter 2 and the enclosure 1, high-frequency mechanical vibrations occur in said enclosure. The vibrations are directed along the axis and are transmitted to the axial rod 3 with the contact lug 4. The respective vibration curves are shown in FIG. 1.

The common oscillatory system formed by the piezoelectric exciter 2, the enclosure 1, and the rods 3 with the contact lugs 4 has a fairly high Q-factor. The amplitude-frequency characteristic $U_4$ (FIG. 8) of such a system has a pronounced maximum $U_{4max}$ at the frequency f of the sine-wave voltage furnished by the generator 16, said frequency being equal to the self-oscillation frequency $f_o$ of the common oscillatory system. Thus, the oscillation frequency of the voltage $U_1$ furnished by the generator 16 is set to be equal to the self-oscillation frequency of the common oscillatory system.

The mechanical vibrations occurring in the oscillatory system due to a direct piezoelectric effect produce the voltage $U_2$ (FIG. 7) in the piezoelectric vibration exciter 2. The frequency of the voltage $U_2$ is equal to the frequency of the mechanical vibrations of the piezoelectric exciter 2 and also to the frequency of the sine-wave voltage $U_1$ of the generator 16 being shifted in phase relative thereto through an angle $\Delta\phi_0$ determined by the parameters of the common oscillatory system. The voltage $U_2$ is fed to the signal input 17 of the phase detector 18 through the measuring electrodes 15 (FIG. 2) to determine a phase shift between the voltages $U_1$ and $U_2$ (FIG. 7). The control input 19 (FIG. 2) of the phase detector 18 accepts the voltage $U_1$ from the generator 16. Depending on the phase difference $\Delta\phi_0$, the detector 18 develops at its output a sum voltage $\pm U_4$ (FIG. 7). Under steady-stage conditions when the contact lug 4 does not contact the surface of the measured part 12 the value $U_4$ is constant.

As the contact lug 4 (FIG. 1) contacts the surface of the measured part 12, the Q-factor of the common oscillatory system drastically decreases. Due to this, the amplitude of the mechanical vibrations of the system decreases whereby the amplitude of the voltage $U_2$ is reduced by $\Delta U$ and becomes equal to $U_5$ (FIG. 8). The AC voltage $U_2$ will be additionally shifted in phase by $\Delta\phi_1$ (FIG. 7) with respect to the voltage $U_1$. When the contact lug 4 contacts the surface of the measured part 12, the amplitude, phase and frequency characteristics of the system sharply change. At the output of the detector 18, the resultant voltage ±U₄ changes depending on the quantity Δϕᵢ. At Δϕ₁ equal to 0 radians U₄ takes the value +U₄. When Δϕ₁ equals π, U₄ takes the value −U₄.

The voltage U₃ produced at the output of the phase detector 18 is utilized as a control signal in the threshold device (not shown in the FIGS.) which furnishes a command signal indicative of the sensor response after the value U₄ reaches a predetermined level. The command signal is applied to a computer controlling the movement of the sensor on the coordinate measuring machine, in accordance with a preset program, for the purpose of determining the parameters of the measured part. A high accuracy of measurements in different directions in space is ensured due to strong dependence of the phase shifts of the compared AC voltages when the Q-factor of the oscillatory system decreases after the contact lug 4 contacts the surface of the measured part 12. This is also due to the appearance of forces caused solely by sliding friction, irrespective of the position of a contact point on the surface of the contact lug 4. The measuring accuracy is also enhanced due to the fact that, during measurements, the displacement of the contact lug 4 does not exceed the amount of elastic deformation of the rods 3 and the sensor assemblies do not have a relative mechanical displacement.

Figure 6:
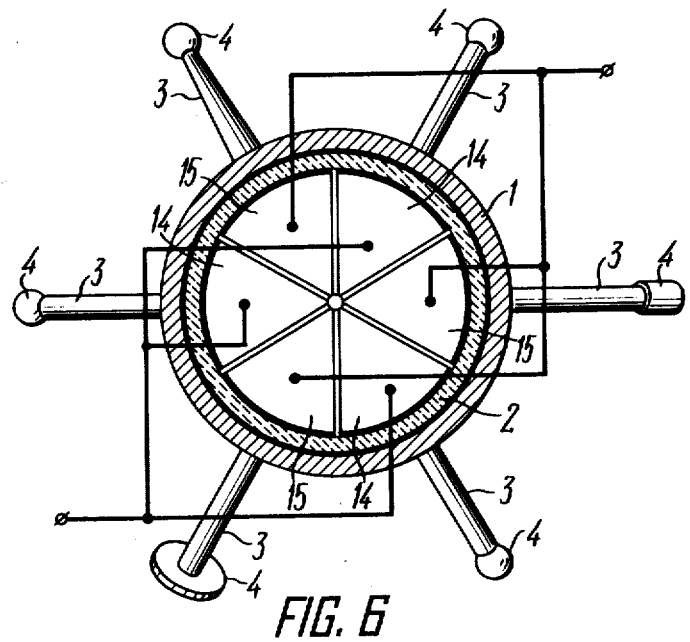
FIG. 6 is a sectional view, taken along the lines VI—VI, of FIG. 5.

The following procedure is used to check the dimensions of a part for compliance with a reference by means of the sensor of the invention. A verifier, which is a ball in the preferred embodiment of the invention, is utilized to verify the coordinates of the centers of the contact lugs 4 and to determine corrections accounting for the radii of the contact lugs 4 and their displacement from the initial to the response position. This is done once for all measurements of dimensions of the various parts. Thereafter, different contact lugs 4 are successively used to determine the dimensions of the part 12 at all points in accordance with a preset program without another verification procedure and rearrangement of the sensor. The number of the rods 3 in the sensor and their orientation with respect to the coordinate axes of the measuring machine are determined beforehand, considering whether the given part is structurally simple or intricate. The sensor having the ball-shaped enclosure 1 (FIG. 1) is preferably used for measuring parts whose check points are disposed in five planes. The contact sensor having the conical enclosure 1 (FIGS. 5 and 6) is suitable for measuring parts with intricate planes directed at an angle to the coordinate planes of the coordinate planes of the coordinate measuring machine. The sensors of FIGS. 4, 5 and 6 operate essentially in the above-mentioned manner.

The present sensor of the invention may be advantageously used in coordinate measuring machines designed to measure linear and angular dimensions and also various deviations from desired shapes and relative position of surfaces of intricately shaped parts. The sensor of the invention is also suitable for determining the moment at which the sensor contacts the surface of a part in microscopes, machines for measuring the length of pipes, thread gauges, industrial robots and manipulators.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A piezoelectric resonant contact sensor, comprising an enclosure in the form of a hollow body of revolution, said enclosure having an external surface and an outer diameter;

a hollow piezoelectric vibration exciter which reproduces the shape of said enclosure and is disposed within said enclosure in a manner providing an acoustic contact, said piezoelectric exciter having an inner surface;

a grounded electrode interposed between said enclosure and said piezoelectric exciter;

an exciting electrode disposed on the inner surface of said piezoelectric exciter;

a sine-wave generator having an output connected to said exciting electrode;

a phase detector having a signal input and a control input connected to the output of said sine-wave generator;

at least two rods disposed on said enclosure in such a manner that their axes are normal to said external surface thereof;

at least two contact lugs secured to the free ends of said rods in a manner providing acoustic contact with said enclosure and forming in conjunction with said rods, said enclosure and said piezoelectric exciter a common oscillatory system wherein the self-oscillation frequency of said enclosure with said rods and said contact lugs is equal to the oscillation frequency of a sine-wave electrical signal; and a measuring electrode disposed on the inner surface of said piezoelectric exciter and connected to the signal input of said phase detector, said measuring electrode being adapted to provide an output electrical signal, a variation of whose phase relative to the phase of said sine-wave signal fed from the output of said sine-wave generator is indicative of the moment at which said contact lug contacts a part to be measured, each of said rods having a length L determined by the expression:

$$L = l_0 + l_1$$

wherein $l_0$ is the distance between the external surface of said enclosure and the nodal point "a" of oscillations of said rod, $$l_1 = \frac{c}{4f_0}(1 + 2n),$$

C is the speed of sound in the material of said rods,
$f_0$ is the self-oscillation frequency of said common oscillatory system, and
n=0, 1, 2 . . . .

2. A piezoelectric resonant contact sensor as claimed in claim 1, wherein each of said rods is of substantially cylindrical shape and has a diameter d determined by the relationship $D/d > 5$, wherein D is the maximum outer diameter of said enclosure.

3. A piezoelectric resonant contact sensor as claimed in claim 2, wherein said enclosure consists of a cylinder and said rods number five, four of said rods being located on said cylindrical external surface of said enclosure in a single plane at an angle of 90° with respect to each other, the fifth of said rods being arranged along the sensor axis on the end-face surface of said enclosure.

4. A piezoelectric resonant contact sensor as claimed in claim 2, wherein said enclosure consists of a ball and said rods member five and are arranged at an angle of 90° with respect to each other, four of said rods being disposed in a plane perpendicular to the sensor axis and the fifth of said rods being located along the sensor axis.

5. A piezoelectric resonant contact sensor as claimed in claim 2, wherein said enclosure consists of a conical structure and said rods number six and are equidistant from the apex of said conical structure and from each other.

6. A piezoelectric resonant contact sensor as claimed in claim 1, wherein said enclosure consists of a cylinder having a cylindrical external surface and said rods number five, four of said rods being located on said cylindrical external surface of said enclosure in a single plane at an angle of 90° with respect to each other, the fifth of said rods being arranged along the sensor axis on the end face surface of said enclosure.

7. A piezoelectric resonant contact sensor as claimed in claim 1, wherein said enclosure consists of a ball and said rods number five and are arranged at an angle of 90° with respect to each other, four of said rods being disposed in a plane perpendicular to the sensor axis and the fifth of said rods being located along the sensor axis.

8. A piezoelectric resonant contact sensor as claimed in claim 1, wherein said enclosure consists of a conical structure and said rods number six and are equidistant from the apex of said conical structure and from each other.

* * * * *